United States Patent [19]

Fischer

[11] Patent Number: 4,642,009
[45] Date of Patent: Feb. 10, 1987

[54] WALL PLUG

[76] Inventor: Artur Fischer, Weinhalde 34, D-7244 Waldachtal 3/Tumlingen, Fed. Rep. of Germany

[21] Appl. No.: 753,675

[22] Filed: Jul. 10, 1985

[30] Foreign Application Priority Data

Jul. 21, 1984 [DE] Fed. Rep. of Germany ....... 3426994

[51] Int. Cl.$^4$ .......................................... A16B 13/04
[52] U.S. Cl. ...................................... 411/38; 411/57; 411/71
[58] Field of Search ...................... 411/34, 35, 36, 37, 411/38, 57, 59, 63, 71, 72, 73, 74

[56] References Cited

U.S. PATENT DOCUMENTS

| 3,143,916 | 8/1964 | Rice | 411/37 |
| 3,937,122 | 2/1976 | Reidel | 411/34 |
| 4,197,781 | 4/1980 | Giannuzzi | 411/34 X |
| 4,340,330 | 7/1982 | Reidel | 411/34 X |

FOREIGN PATENT DOCUMENTS

| 212600 | 7/1956 | Australia | 411/38 |
| 325832 | 1/1975 | Austria . | |
| 652838 | 9/1964 | Belgium | 411/71 |
| 0064768 | 11/1982 | European Pat. Off. | 411/60 |
| 1292947 | 4/1969 | Fed. Rep. of Germany | 411/72 |
| 2328385 | 12/1973 | Fed. Rep. of Germany . | |
| 1977125 | 1/1977 | Fed. Rep. of Germany . | |
| 3237465 | 4/1984 | Fed. Rep. of Germany . | |
| 311371 | 9/1933 | Italy | 411/72 |
| 387262 | 5/1965 | Switzerland | 411/71 |
| 1541590 | 3/1979 | United Kingdom | 411/38 |
| 2053072 | 2/1981 | United Kingdom . | |

Primary Examiner—Thomas J. Holko
Attorney, Agent, or Firm—Michael J. Striker

[57] ABSTRACT

A wall plug for fastening articles to hollow building materials such as panels and hollow walls, and also solid building materials, including a first end part having a longitudinal bore, a second end part having a longitudinal bore, two limbs extending at one end from the first end part and connected at another end to the second end part, the two limbs having two facing surfaces separated by a slot, and a central region having an elliptical cross-sectional profile that has a major and a minor diameter and which gradually becomes circular towards the first end part and towards the second end part, the slot having a width substantially corresponding to the difference between the major and minor diameters of the elliptical cross-sectional profile, and longitudinal ribs provided in the facing surfaces of the two limbs to provide a continuation of the longitudinal bore in the top part.

9 Claims, 3 Drawing Figures

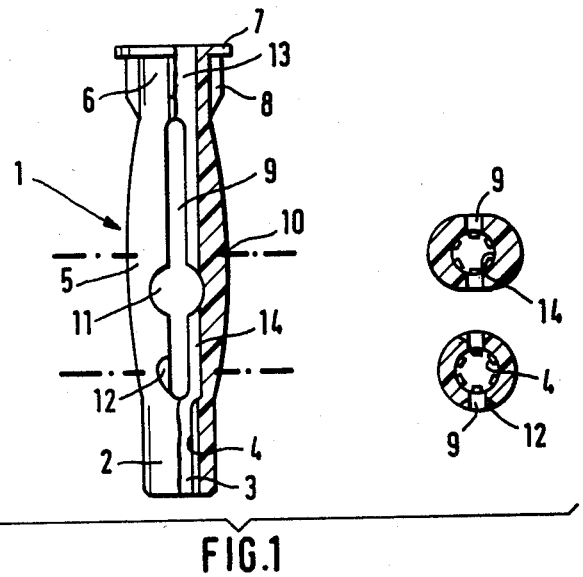
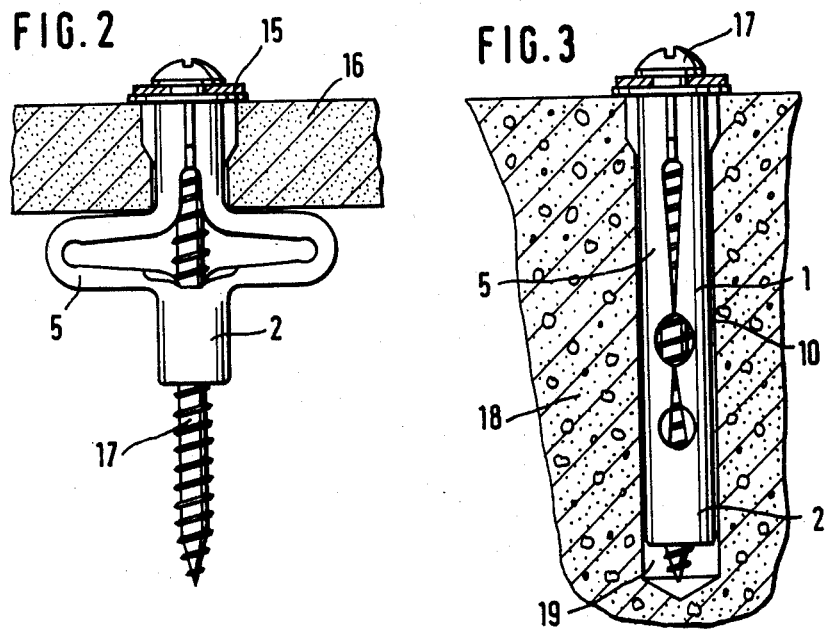

WALL PLUG

BACKGROUND OF THE INVENTION

The present invention relates to a wall plug for fastening articles to panels, hollow walls and similar structures, and also solid building materials. Such a wall plug includes a lower end part having a longitudinal bore with an internal thread or internal ribs, and two limbs leading off the lower end part which are held together by means of a top part similarly having a longitudinal bore and provided with a flange and a means for preventing rotation of the plug.

A wide variety of wall plugs of the type mentioned above are known in the art from a number of my numerous prior patents. These plugs being intended for use in both hollow walls and in solid building materials. Ordinarily such wall plugs are provided with more than two limbs. Due to the low rigidity of these limbs against torsion, when a screw is screwed into the longitudinal bore of the lower end part, a twist is achieved which leads to the formation of an enlargement caused by the limbs becoming superimposed upon one another. To achieve a uniform formation of the enlargement it is generally necessary for the wall plug to be made of a very soft plastic material. Use of such a material has the following consequences, firstly, overturning the screw in the longitudinal bore of the lower end part occurs easily resulting in an insignificant tightening moment for fastening an article and, secondly high pull out values cannot be obtained when using the wall plug in solid building materials due to the non-rigid plastic material. In addition, long-term fastening values are inadequate for high-quality fastenings due to the undesirable flow properties of the non rigid plastic material.

SUMMARY OF THE INVENTION

It is an object of the present invention to produce a wall plug for fastening articles to panels, hollow walls and similar structures and also to solid building materials, which allows the use of a relatively high-quality plastic material and thereby provide higher pull-out values, especially in solid building materials.

Pursuant to this object and others which will become apparent hereinafter, one aspect of the invention resides in a wall plug having two limbs which in their central region have a cross-sectional profile which is elliptical and gradually becomes circular towards both the lower end part and the top part, the two facing surfaces of the limbs are separated by a slot having an inside width which corresponds to the difference between the major and minor diameters of the ellipse. The slot surfaces of the limbs are provided with longitudinal grooves so as to provide a continuation of the longitudinal bore in the top part.

When using the wall plug according to the invention for fastening articles to panels, hollow walls and similar structures, a fastening screw is screwed into the longitudinal bore in the lower end part causing the wall plug to be folded up axially with the two limbs buckling radially outwards. A support acting as a counter-element is thereby produced at the rear of the panel so that it is possible to clamp an article so that it is fastened. Due to the elliptical shape of the limbs, which is most marked in the middle region, a force component acting in a radial direction is produced as the wall plug is folded up. This force component promotes the outward buckling.

When using the wall plug in solid building materials the wall plug is hammered into a drill hole corresponding to the outer diameter of the lower end-part or of the top part. The elliptical thickened portion of the limbs is compressed to the diameter of the drill hole causing the dimension of the inside width of the slot to decrease to the point where the slot faces come into contact with one another in the central region of the limbs. This narrowing of the slot causes a corresponding displacement and wedging of the wall plug material in the drill hole as the fastening screw is screwed in. The longitudinal grooves in the slot face of the two limbs extend from the longitudinal bore in the top part thereby forming a tapering passage for the screw which acts to guide the screw and makes it easy for the screw to bite into the material of the wall plug. This passage for the screw insures that the tip of the screw is guided into the longitudinal bore in the lower end part. Due to the narrowing of the gap, the wall plug has the same effect in solid building materials as known expansible wall plugs intended essentially for solid building materials. Since, in order to anchor the wall plug in panels and hollow walls, it is not necessary for an enlargement to be formed by twisting a limb, but merely for the limb to buckle outwardly, the wall plug can be manufactured from a high-strength plastic material so that high pull-out values may be achieved even in solid building materials.

In another embodiment of the invention a region of weakened cross-section is arranged in the central region of the limbs, the weakened region preferably being formed by a transverse bore running in the plane of the slot.

With this region of weakened cross-section, which has only an insignificant adverse effect on anchoring in solid materials, the buckling point is determined by expansion in an open space. Merely slight pulling forces introduced into the lower end-part by way of the screw are sufficient to cause the outward buckling to take place. This additional assistance to insure outward buckling of the plug is particularly advantageous for use of the wall plug in plasterboard panels since the top part can absorb only a slight turning moment in such panels.

In yet another embodiment, a further improvement in the ability of the wall plug to buckle outwards is provided by notches extending at right angles to the plane of the slot and weakening of the cross-section may be arranged in the region where the limbs are connected to the lower end part.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 1 illustrates a wall plug pursuant to the invention;

FIG. 2 illustrates the fastening of an article to a panel using the wall plug; and FIG. 3 shows the fastening of an article to a solid building material using the wall plug.

DESCRIPTION OF THE PREFERRED EMBODIMENTS

As can be seen in FIG. 1, the wall plug 1 includes a lower end part 2 having a longitudinal bore 3 with internal ribs 4, and two limbs 5 leading out from the lower end part 2 and which are held together by a top part 6. The top part 6 is provided with a flange 7 which projects at right angles as a means for preventing the wall plug from being pushed through, and ribs 8 which bite into the wall of the drill hole to inhibit rotation of the plug. The limbs 5 have a central region with a cross-sectional profile formed as an ellipse which becomes a circle towards the top part 6 and the lower end part 2. The small diameter of the ellipse corresponds approximately to the diameter of the drill hole. The limbs 5 are separated by a slot 9 which extends from the top part 6 down to the lower end part 2. The slot 9 has an inside width which corresponds to the difference between the large and small diameters of the ellipse at the largest portion 10 of limbs 5. The limbs can thereby be compressed to a diameter of the drill hole.

To facilitate outward buckling in the region of the largest portion of the limbs, a region of weakened cross-section is provided. This weakened section is formed by a transverse bore 11 running in the plane of the slot. A further region of weakened cross-section is located in the region where the limbs 5 merge into the lower end part 2. This further region of weakened cross-section is formed by two notches 12 extending at right angles to the plane of the slot. For guiding the screw, each of the limbs 5 has a slot face with a longitudinal groove 14 extending from the longitudinal bore 13 in the top part 6 to the longitudinal bore 3 in the lower end part 2.

As seen in FIG. 2, to fasten an article 15 to a panel 16, a fastening screw 17 is turned into the longitudinal bore 3 of the lower end part 2, thereby causing the lower end part 2 to be drawn towards the rear of the panel 16. Limbs 5 are forced to buckle radially outwards at the buckling point and fold axially together. A counter-member having a large area is thus formed at the rear of the panel and provides high pull-out values even in soft and porous panels, such as plasterboard panels.

FIG. 3 illustrates anchoring of a wall plug 1 in a solid building material 18. As the wall plug 1 is driven into the drill hole 19 corresponding to the diameter of the lower end part 2 and the top part 6, the two limbs 5 are compressed together due to their enlarged part 10 causing the slot faces of the limbs 5 to touch in the central region. A narrowing is thereby formed which permits the material of the wall plug 1 to displace and become wedged as the fastening screw 17 is screwed in. The passage for the screw formed by the two longitudinal grooves 14 in the slot faces of the limbs 5 serves to guide the screw 17 until it enters the longitudinal bore 3 in the lower end part 2.

While the invention has been illustrated and described as embodied in a wall plug, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A wall plug for fastening articles to building materials, comprising: a first end part having a longitudinal bore, said longitudinal bore of said first end part being provided with internal threading means which receives in assembly a fastening screw; a second end part having a longitudinal bore and provided with means for preventing rotation of the plug during fastening; two non-flat limbs each having a smooth outer surface and extending at one end from said first end part and connected at another end to said second end part, said limbs having two facing surfaces separated by a slot, and a central region having an elliptical cross-sectional profile which has a major and a minor diameter and which gradually becomes circular towards said first end part and said second end part, said slot having a width substantially corresponding to the difference between said major and minor diameters of said elliptical cross-sectional profile, said facing surfaces of said limbs being provided with longitudinal ribs; and means forming a weakened cross-section in said central region of said limbs, whereby the wall plug can be used for fastening articles to hollow building materials such as panels and hollow walls wherein, upon screwing of said fastening bolt into the plug, said limbs are forced to buckle radially outwards and fold axially of the plug and for fastening articles in solid building materials wherein upon screwing of said fastening bolt into the plug, said two limbs are compressed together causing said facing surface to touch in said central region.

2. A wall plug as defined in claim 1, wherein said threading means of said longitudinal bore of said first end part includes an internal thread.

3. A wall plug as defined in claim 1, wherein said internal threading means of said longitudinal bore of said first end part includes internal ribs.

4. A wall plug as defined in claim 1, wherein said second end part is provided with a flange.

5. A wall plug as defined in claim 4, wherein said means for inhibiting rotation includes a plurality of longitudinal ribs extending radially from said second end part.

6. A wall plug as defined in claim 1, wherein said weakened cross-section forming means includes a transverse bore running in the plane of the slot.

7. A wall plug as defined in claim 1; and further comprising means forming a weakened cross-section arranged in a region where said two limbs merge into said lower end part, said weakened cross-section forming means including notches extending at right angles to the plane of said slot.

8. A wall plug as defined in claim 1; and further comprising first means for forming a weakened cross-section in said central region of said two limbs, said first means including a transverse bore running in the plane of the slot, and second means for forming a weakened cross-section in a region where said two limbs merge into said lower end part, said second means including notches extending at right angles to the plane of the slot.

9. A wall plug as defined in claim 1, wherein said longitudinal bore of said second end part is provided with ribs, said longitudinal ribs of said limbs being formed as a continuation of said ribs in said second end part.

* * * * *